(12) United States Patent
Park et al.

(10) Patent No.: US 8,824,578 B2
(45) Date of Patent: Sep. 2, 2014

(54) SYSTEM AND METHOD OF SINGLE-CARRIER LAYER SHIFTING FOR MULTIPLE-STREAM TRANSMISSION FACILITATING SIC IMPLEMENTATION

(75) Inventors: Chester Park, Durham, NC (US); George Jongren, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 102 days.

(21) Appl. No.: 13/128,932

(22) PCT Filed: Nov. 10, 2009

(86) PCT No.: PCT/IB2009/007401
§ 371 (c)(1),
(2), (4) Date: Sep. 9, 2011

(87) PCT Pub. No.: WO2010/055387
PCT Pub. Date: May 20, 2010

(65) Prior Publication Data
US 2011/0310932 A1    Dec. 22, 2011

Related U.S. Application Data

(60) Provisional application No. 61/113,944, filed on Nov. 12, 2008.

(51) Int. Cl.
H04B 1/707 (2011.01)
H04L 5/00 (2006.01)
H04L 27/26 (2006.01)

(52) U.S. Cl.
CPC .......... *H04L 5/0023* (2013.01); *H04L 27/2636* (2013.01)
USPC .......................................... 375/260; 375/141

(58) Field of Classification Search
CPC .................................................. H04L 27/2636
USPC .................................................. 375/260, 141
See application file for complete search history.

(56) References Cited

U.S. PATENT DOCUMENTS

| 5,541,025 A * | 7/1996 | Oi et al. ............................ 430/5 |
| 7,986,746 B2 * | 7/2011 | Steer ............................. 375/295 |
| 2011/0122819 A1 * | 5/2011 | Jongren et al. ................ 370/328 |

FOREIGN PATENT DOCUMENTS

| EP | 1942623 A1 | 7/2008 |
| WO | WO 2008/030806 A2 | 3/2008 |
| WO | WO 2009/134082 A2 | 5/2008 |

OTHER PUBLICATIONS

ETRI: "Discussion on the Layer Shifting Pattern for SU-MIMO in LTE-A" 3GPP Draft; RI-094312 Layer Shifting Patterns for UL SU-MIMO, 3rd Generation Partnership Project (3GPP), Mobile Competence Centre, Oct. 12, 2009, XP050388768, France.
Ericsson: "Uplink SU-MIMO in LTE-Advanced" 3GPP Draft; RI-092027, 3rd Generation Partnership Project (3GPP), Mobile Competence Centre, Apr. 28, 2009, XP050339495, France.

* cited by examiner

*Primary Examiner* — Michael Neff (57) ABSTRACT

A system, method and node of single-carrier layer shifting for multiple-stream transmission in a network. Per-symbol layer shifting for multiple-stream transmission is implemented using DFTS-OFDM as an access technique. Code word-to-layer mapping is fixed within a DFTS-OFDM symbol and only shifted across consecutive DFTS-OFDM symbols. The method begins by receiving a multiple-stream transmission by a mapping module for transmission. The transmission includes a plurality of subframes and information carrying symbols transmitted on a plurality of layers. A per-symbol layer shifting scheme is then implemented on the transmission where layer shifting is conducted upon each symbol.

30 Claims, 6 Drawing Sheets

SYSTEM AND METHOD OF SINGLE-CARRIER LAYER SHIFTING FOR MULTIPLE-STREAM TRANSMISSION FACILITATING SIC IMPLEMENTATION

This application claims the benefit of U.S. Provisional Application No. 61/113,944, filed Nov. 12, 2008, the disclosure of which is fully incorporated herein by reference.

TECHNICAL FIELD

The present invention relates to communications networks. More particularly, and not by way of limitation, the present invention is directed to a system and method of single-carrier layer shifting for multiple-stream transmission facilitating Successive Interference Cancellation (SIC) implementation.

BACKGROUND

In high-speed wireless communications, multiple streams are ideally transmitted over the air simultaneously. For example, a Multiple Input Multiple Output (MIMO) scheme enables multiple-stream transmission by using multiple transmits and/or receive antennas. Each stream is called a layer and corresponds to a sequence of modulation symbols. The layers are either directly mapped to the antenna ports or may first undergo a transformation by means of channel dependent or channel independent pre-coding.

The multiple streams come from single/multiple code words. The code words should be mapped into multiple streams in a proper way. If multiple streams experience different channel quality, it is often beneficial to shift the layer mapped from a specific code word by a certain amount, which effectively transmits each code word across multiple layers. This layer shifting helps achieve diversity gain which leads to improved error performance. The layer shifting is generally performed in a per-sample basis to maximize diversity gain. Thus, the layer or layers mapped from a code word are shifted for every sample (i.e., every modulation symbol).

To decompose the multiple layers at the receiver, several equalization techniques may be used. The simplest equalization is linear equalization, such as Zero Forcing (ZF)/Minimum Mean Square Error (MMSE) equalization. To improve the error performance, decision feedback equalization called SIC may be used when multiple code words are transmitted. Since SIC cancels the previously decoded layers from the received signal, SIC always outperforms linear equalization if the previous decoding is sufficiently reliable. One of the disadvantages of SIC is that SIC requires additional computation, such as signal reconstruction and cancellation.

Figure 1:
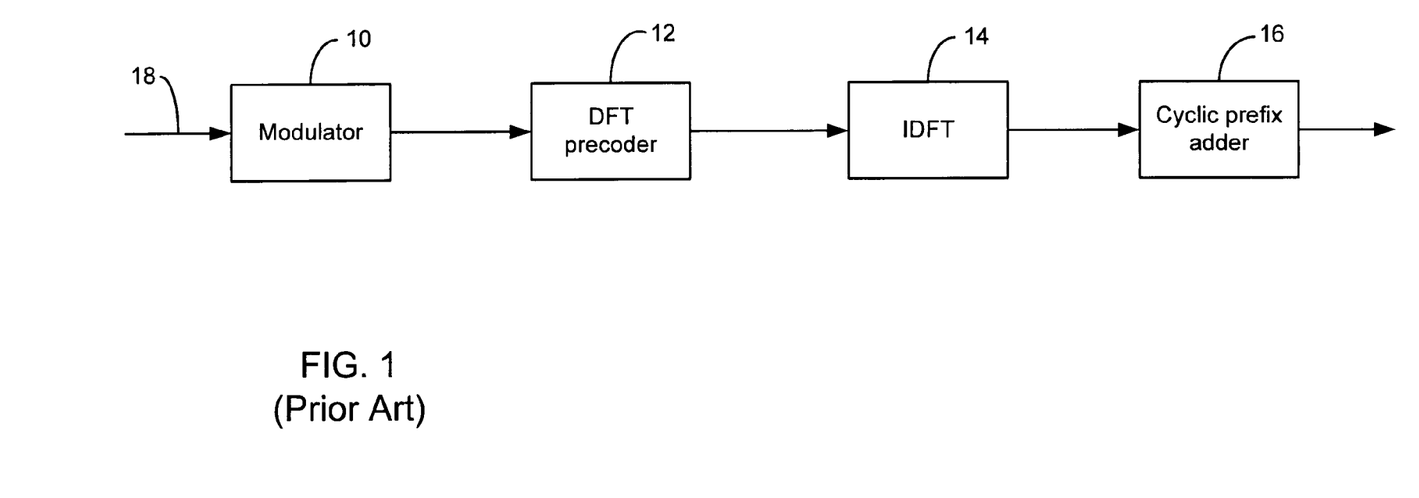
FIG. 1 (prior art) is a simplified block diagram of components of an existing DFTS-OFDM system.

Oftentimes, layer shifting is applied to a multiple layer MIMO transmission combined with Discreet Fourier Transform Spread (DFTS)-Orthogonal Frequency Division Multiplexing (OFDM). DFTS-OFDM is a technique for single-carrier transmission used in a Long Term Evolution (LTE) uplink for at least single antenna transmissions. In each subframe, spanning 1 millisecond, transmission of a block of information bits corresponding to a transport block is possible. FIG. 1 is a simplified block diagram of components of an existing DFTS-OFDM system. The system includes a modulator 10, a DFT precoder 12, an Inverse Discrete Fourier Transform (IDFT) 14, and a cyclic prefix adder 16 for processing a signal 18. The information block is coded and passed through the modulator 10 to produce information carrying symbols that are subsequently transformed to the frequency domain by means of the Discreet Fourier Transform (DFT) precoder. The output of the DFT precoder is connected to potentially only a subset of the inputs of the IDFT 14, producing a time domain signal corresponding to one DFTS-OFDM symbol. A cyclic prefix is added (at the cyclic prefix adder 16) to the time domain signal which is thereafter transmitted over the channel. This enables transmissions over only a part of the system bandwidth while simplifying channel equalization in the receiver by utilizing an efficient support of frequency domain equalization.

For an example, a subframe is divided into two slots and comprises a number of DFTS-OFDM symbols and two symbols for reference signals. The number of DFTS-OFDM symbols depends on the length of the cyclic prefix and is either 12 or 10.

As mentioned previously, linear equalization is simple, but suffers from nontrivial performance loss. One attractive solution is decision feedback equalization, such as SIC. However, when per-sample layer shifting is applied to DFTS-OFDM, the equalization following each cancellation becomes extremely complex since the equivalent system after cancellation is no longer seen as the per-layer DFT followed by a per-subcarrier frequency-flat fading channel. Thus, the equalization may be performed over the entire DFTS-OFDM symbol, which results in prohibitively high computational complexity (as opposed to multi-carrier systems or single carrier systems without per-sample layer shifting whose equalization is performed on a per-subcarrier basis).

To illustrate this problem, assume that there are $N_t$ transmit antennas and two receive antennas, and a DFTS-OFDM symbol consists of two layers and K subcarriers. The 2K×1 vector symbol y representing the frequency-domain received symbols within a DFTS-OFDM symbol is then expressed as $$y=\sqrt{\alpha K}E(F_K \otimes I_2)s+w \quad (1)$$

where
  $F_K$ is a K×K matrix representing the DFT,
  E is a 2K×2K matrix representing the equivalent channel (including the precoder),
  s is a 2K×1 vector representing the transmitted symbols,
  w is a 2K×1 vector representing the noise symbols.
$F_K \otimes I_2$ in (1) represents the per-layer DFT. In addition, the transmit power is normalized through α, which is defined as $$\alpha = \frac{N}{K}\frac{E_s}{N_t},$$

where
  N is the total number of subcarriers,
  $E_s$ is the received energy per subcarrier.
Since each subcarrier experiences frequency-flat fading due to orthogonality, the equivalent channel matrix E is a block-diagonal matrix expressed as $$E=\mathrm{diag}(E_0, E_1, \ldots, E_{K-1}) \quad (2)$$

where the 2×2 matrix $E_k$ represents the equivalent channel (including the precoder) at the k-th subcarrier.

Figure 2:
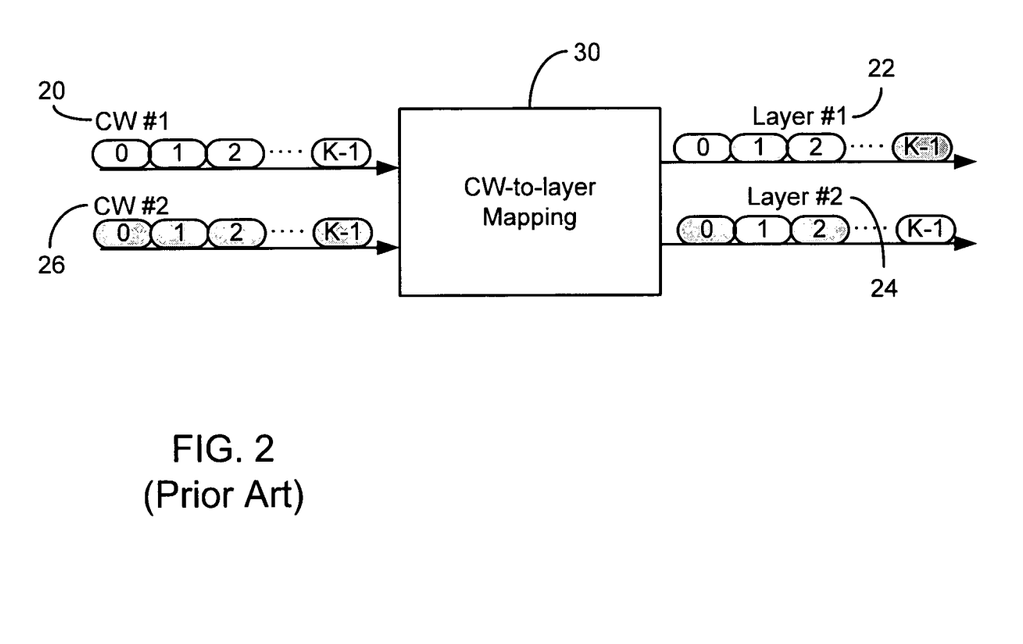
FIG. 2 (prior art) is a simplified block diagram illustrating layer shifting in a per-sample basis in an existing system.

For illustrative purposes, assume that two code words are mapped into two layers according to per-sample layer shifting. FIG. 2 is a simplified block diagram illustrating layer shifting in a per-sample basis in an existing system. Specifically, code word (CW) #1 20 is mapped into a Layer #1 22 at the first sample. However, CW #1 is mapped into a Layer #2 24 at the second sample and vice versa. CW #2 26 is mapped at a first sample into the Layer #1 while the second sample is mapped into the Layer #2 and so forth. A sample corresponds to a time instant. In FIG. 2, each codeword spans K samples and two modulation symbols (one per codeword) are fed into a CW-to-layer mapping 30 at each time instant.

If CW 1 is decoded first, the 2K×1 vector symbol y' representing the frequency-domain received symbols after cancellation is expressed as $$y' = \sqrt{\alpha K} G s' + w \qquad (3)$$

where

G is 2K×K vector representing the equivalent channel (including the precoder and DFT), s' is a K×1 vector representing the transmitted symbols after cancellation.

Here G is given as $$G = \begin{pmatrix} e_{0,1}f_{0,0} & e_{0,0}f_{0,1} & e_{0,1}f_{0,2} & e_{0,0}f_{0,3} & \cdots & e_{0,1}f_{0,K-2} & e_{0,0}f_{0,K-1} \\ e_{1,1}f_{1,0} & e_{1,0}f_{1,1} & e_{1,1}f_{1,2} & e_{1,0}f_{1,3} & \cdots & e_{1,1}f_{1,K-2} & e_{1,0}f_{1,K-1} \\ \vdots & \vdots & \vdots & \vdots & \ddots & \vdots & \vdots \\ e_{K-1,1}f_{K-1,0} & e_{K-1,0}f_{K-1,1} & e_{K-1,1}f_{K-1,2} & e_{K-1,0}f_{K-1,3} & \cdots & e_{K-1,1}f_{K-1,K-2} & e_{K-1,0}f_{K-1,K-1} \end{pmatrix} \qquad (4)$$

where $e_{k,n}$ is the n-th column vector of $E_k$, $f_{k,l}$ is the (k,l)-entry of $F_K$.

In order to decompose G into a block-diagonal matrix (representing the per-subcarrier frequency-flat fading channel) and a unitary matrix (representing the per-layer DFT), each row of G should consist of block matrices which are given by scalar multiplications of the same matrix. However, as shown in equation (4), the decomposition is impossible because of layer shifting within a DFTS-OFDM symbol. For example, the sub-matrices at the k-th row of G are given by scalar multiplications of either $e_{k,0}$ or $e_{k,1}$ (depending on the column indices). Therefore, it would be advantageous to perform equalization over the entire DFTS-OFDM symbol (neither in a per-subcarrier basis nor in a per-layer basis as opposed to that without layer shifting), which causes extremely high computational complexity.

Layer shifting within a DFTS-OFDM symbol is undesirable for other reasons. Consider the matrix X of frequency domain 2×1 transmit vectors after DFT precoding:

$$X = [s_0\ s_1 \ldots s_{K-1}]F_K^T = SF_K^T$$

$$x = \text{vec}(X) = \text{vec}(I_2 S F_K^T) = \{\text{vec}(ABC) = (C^T \otimes A)\text{vec}(B)\} = (F_K \otimes I_2)\text{vec}(S)$$

$$= [x_0^{(1)}\ x_0^{(2)}\ x_1^{(1)}\ x_1^{(2)}\ x_2^{(1)}\ x_2^{(2)} \ldots x_{K-1}^{(1)}\ x_{K-1}^{(2)}]^T$$

The received signal vector y can then be written as $$y = \begin{bmatrix} E_0 & 0 & \cdots & 0 \\ 0 & E_1 & & \vdots \\ \vdots & & \ddots & 0 \\ 0 & \cdots & 0 & E_{K-1} \end{bmatrix} x$$

$$= \begin{bmatrix} E_0 & 0 & \cdots & 0 \\ 0 & E_1 & & \vdots \\ \vdots & & \ddots & 0 \\ 0 & \cdots & 0 & E_{K-1} \end{bmatrix} (F_K \otimes I_2)\text{vec}(S)$$

$$= \begin{bmatrix} E_0 & 0 & \cdots & 0 \\ 0 & E_1 & & \vdots \\ \vdots & & \ddots & 0 \\ 0 & \cdots & 0 & E_{K-1} \end{bmatrix} (F_K \otimes I_2) \begin{bmatrix} s_0^{(1)} \\ s_0^{(2)} \\ s_1^{(1)} \\ s_1^{(2)} \\ \vdots \\ s_{K-1}^{(1)} \\ s_{K-1}^{(2)} \end{bmatrix}$$

$$= \begin{bmatrix} E_0 & 0 & \cdots & 0 \\ 0 & E_1 & & \vdots \\ \vdots & & \ddots & 0 \\ 0 & \cdots & 0 & E_{K-1} \end{bmatrix} \left( \left( F_K \otimes \begin{bmatrix} 1 & 0 \\ 0 & 0 \end{bmatrix} \right) + \left( F_K \otimes \begin{bmatrix} 0 & 0 \\ 0 & 1 \end{bmatrix} \right) \right) \begin{bmatrix} s_0^{(1)} \\ s_0^{(2)} \\ s_1^{(1)} \\ s_1^{(2)} \\ \vdots \\ s_{K-1}^{(1)} \\ s_{K-1}^{(2)} \end{bmatrix}$$

$$= \left( \begin{bmatrix} e_0^{(1)} & 0 & \cdots & 0 \\ 0 & e_1^{(1)} & & \vdots \\ \vdots & & \ddots & 0 \\ 0 & \cdots & 0 & e_{K-1}^{(1)} \end{bmatrix} (F_K \otimes [1\ 0]) + \begin{bmatrix} e_0^{(2)} & 0 & \cdots & 0 \\ 0 & e_1^{(2)} & & \vdots \\ \vdots & & \ddots & 0 \\ 0 & \cdots & 0 & e_{K-1}^{(2)} \end{bmatrix} (F_K \otimes [0\ 1]) \right) \begin{bmatrix} s_0^{(1)} \\ s_0^{(2)} \\ s_1^{(1)} \\ s_1^{(2)} \\ \vdots \\ s_{K-1}^{(1)} \\ s_{K-1}^{(2)} \end{bmatrix}$$

$$= \begin{bmatrix} e_0^{(1)} & 0 & \cdots & 0 \\ 0 & e_1^{(1)} & & \vdots \\ \vdots & & \ddots & 0 \\ 0 & \cdots & 0 & e_{K-1}^{(1)} \end{bmatrix} F_K \begin{bmatrix} s_0^{(1)} \\ s_1^{(1)} \\ \vdots \\ s_{K-1}^{(1)} \end{bmatrix} + \begin{bmatrix} e_0^{(2)} & 0 & \cdots & 0 \\ 0 & e_1^{(2)} & & \vdots \\ \vdots & & \ddots & 0 \\ 0 & \cdots & 0 & e_{K-1}^{(2)} \end{bmatrix} F_K \begin{bmatrix} s_0^{(2)} \\ s_1^{(2)} \\ \vdots \\ s_{K-1}^{(2)} \end{bmatrix}$$

From the expression for the last equality sign, it is clear that each of the two terms has the structure block diagonal matrix multiplied by FFT matrix. Thus, frequency domain equalization followed by IFFT can be applied to decode either of the terms when the other term has been cancelled. SIC then achieves reasonable complexity. The last equation is consistent with equation (6) discussed below.

Considering the above expression with the layer shifting case having the DFTS-OFDM symbol:

$$y = \begin{bmatrix} e_0^{(1)} & 0 & \cdots & 0 \\ 0 & e_1^{(1)} & & \vdots \\ \vdots & & \ddots & 0 \\ 0 & \cdots & 0 & e_{K-1}^{(1)} \end{bmatrix} F_K \begin{bmatrix} s_0^{(1)} \\ s_1^{(1)} \\ \vdots \\ s_{K-1}^{(1)} \end{bmatrix} + \begin{bmatrix} e_0^{(2)} & 0 & \cdots & 0 \\ 0 & e_1^{(2)} & & \vdots \\ \vdots & & \ddots & 0 \\ 0 & \cdots & 0 & e_{K-1}^{(2)} \end{bmatrix} F_K \begin{bmatrix} s_0^{(2)} \\ s_1^{(2)} \\ \vdots \\ s_{K-1}^{(2)} \end{bmatrix}$$

$$= \begin{bmatrix} e_0^{(1)} f_{1,1} & e_0^{(1)} f_{1,2} & \cdots & e_0^{(1)} f_{1,K} \\ e_1^{(1)} f_{2,1} & e_1^{(1)} f_{2,2} & \cdots & e_1^{(1)} f_{2,K} \\ \vdots & \vdots & \ddots & \vdots \\ e_{K-1}^{(1)} f_{K,1} & e_{K-1}^{(1)} f_{K,2} & \cdots & e_{K-1}^{(1)} f_{K,} \end{bmatrix} \begin{bmatrix} s_0^{(1)} \\ s_1^{(1)} \\ \vdots \\ s_{K-1}^{(1)} \end{bmatrix} + \begin{bmatrix} e_0^{(2)} f_{1,1} & e_0^{(2)} f_{1,2} & \cdots & e_0^{(2)} f_{1,K} \\ e_1^{(2)} f_{2,1} & e_1^{(2)} f_{2,2} & \cdots & e_1^{(2)} f_{2,K} \\ \vdots & \vdots & \ddots & \vdots \\ e_{K-1}^{(2)} f_{K,1} & e_{K-1}^{(2)} f_{K,2} & \cdots & e_{K-1}^{(2)} f_{K,K} \end{bmatrix} \begin{bmatrix} s_0^{(2)} \\ s_1^{(2)} \\ \vdots \\ s_{K-1}^{(2)} \end{bmatrix}$$

$$= \begin{cases} \text{assume second codeword is zero/canceled and layer shifting is used} \Rightarrow \\ \text{odd numbered columns from first antenna and even numbered columns for second antenna } ar \end{cases}$$

$$= \begin{bmatrix} e_0^{(1)} f_{1,1} & e_0^{(1)} f_{1,3} & \cdots & e_0^{(1)} f_{1,K-1} \\ e_1^{(1)} f_{2,1} & e_1^{(1)} f_{2,3} & \cdots & e_1^{(1)} f_{2,K-1} \\ \vdots & \vdots & \ddots & \vdots \\ e_{K-1}^{(1)} f_{K,1} & e_{K-1}^{(1)} f_{K,3} & \cdots & e_{K-1}^{(1)} f_{K,K-1} \end{bmatrix} \begin{bmatrix} s_0^{(1)} \\ s_2^{(1)} \\ \vdots \\ s_{K-2}^{(1)} \end{bmatrix} + \begin{bmatrix} e_0^{(2)} f_{1,2} & e_0^{(2)} f_{1,4} & \cdots & e_0^{(2)} f_{1,K} \\ e_1^{(2)} f_{2,2} & e_1^{(2)} f_{2,4} & \cdots & e_1^{(2)} f_{2,K} \\ \vdots & \vdots & \ddots & \vdots \\ e_{K-1}^{(2)} f_{K,2} & e_{K-1}^{(2)} f_{K,4} & \cdots & e_{K-1}^{(2)} f_{K,K} \end{bmatrix} \begin{bmatrix} s_1^{(2)} \\ s_3^{(2)} \\ \vdots \\ s_{K-1}^{(2)} \end{bmatrix}$$

$$= \begin{bmatrix} e_0^{(1)} f_{1,1} & e_0^{(2)} f_{1,2} & e_0^{(1)} f_{1,3} & e_0^{(2)} f_{1,4} & \cdots & e_0^{(1)} f_{1,K-1} & e_0^{(2)} f_{1,K} \\ e_1^{(1)} f_{2,1} & e_1^{(2)} f_{2,2} & e_1^{(1)} f_{2,3} & e_1^{(2)} f_{2,4} & \cdots & e_1^{(1)} f_{2,K-1} & e_1^{(2)} f_{2,K} \\ \vdots & & & & & & \vdots \\ e_{K-1}^{(1)} f_{K,1} & e_{K-1}^{(2)} f_{K,2} & e_{K-1}^{(1)} f_{K,3} & e_{K-1}^{(2)} f_{K,4} & \cdots & e_{K-1}^{(1)} f_{K,K-1} & e_{K-1}^{(2)} f_{K,K} \end{bmatrix} \begin{bmatrix} s_0^{(1)} \\ s_1^{(2)} \\ s_2^{(1)} \\ s_3^{(2)} \\ \vdots \\ s_{K-2}^{(1)} \\ s_{K-1}^{(2)} \end{bmatrix}$$

The above expression includes columns that are alternating between the transmit antennas. This cannot be formulated as the product of a block diagonal matrix and a Fast Fourier Transform (FFT) matrix unless the channels from both transmit antennas are equal for all subcarriers. Thus, only in such a rare special case would the receiver decompose into frequency domain equalization followed by Inverse Fast Fourier Transform (IFFT). The last equation is consistent with equation (4).

SUMMARY

The present invention performs per-symbol layer shifting for multiple-stream transmission using DFTS-OFDM as an access technique. Code word-to-layer mapping is fixed within a DFTS-OFDM symbol and only shifted across consecutive DFTS-OFDM symbols.

In one aspect, the present invention is directed at a method of single-carrier layer shifting for multiple-stream transmission in a network. The method begins by receiving a multiple-stream transmission by a mapping module for transmission. The transmission includes a plurality of subframes and information carrying symbols transmitted on a plurality of layers. A per-symbol layer shifting scheme is then implemented on the transmission where layer shifting is conducted upon each symbol.

In another aspect, the present invention is directed at a system for single-carrier layer shifting for multiple-stream transmission in a network. The system includes a first communication device having a mapping module for processing a multiple-stream transmission for transmission to a second communication device. The transmission includes a plurality of subframes and a plurality of information carrying symbols transmitted on a plurality of layers. The system implements per-symbol layer shifting on the transmission where layer shifting is conducted upon each symbol.

In still another aspect, the present invention is directed at a node for single-carrier layer shifting for multiple-stream transmission in a network. The node processes a multiple-stream transmission for transmission from a first communication device to a second communication device. The transmission includes a plurality of subframes and a plurality of information carrying symbols transmitted on a plurality of layers. The node implements per-symbol layer shifting on the transmission where layer shifting is conducted upon each symbol.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Figure 3:
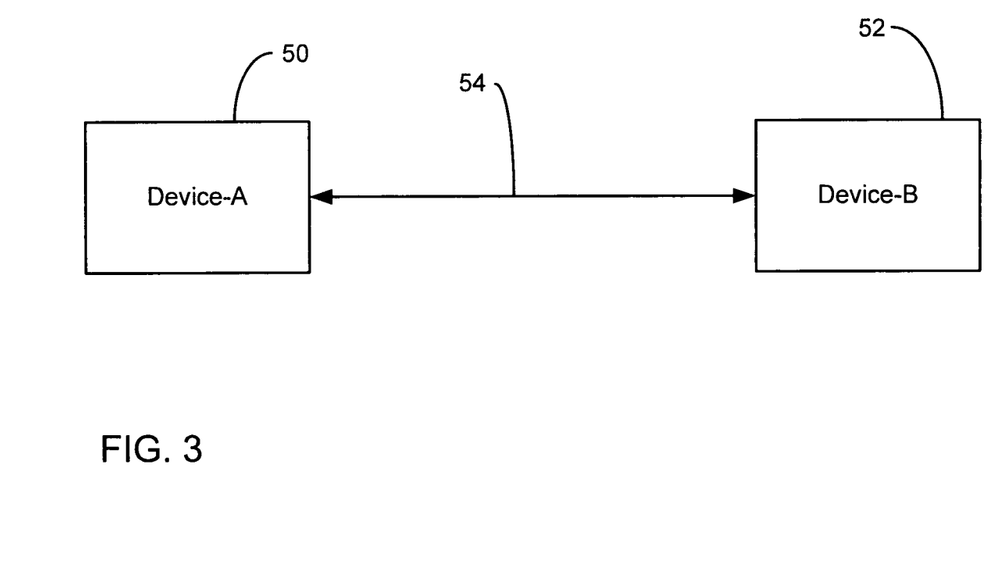
FIG. 3 is a simplified block diagram of a device-A and a device-B communicating over a channel in the preferred embodiment of the present invention.

The present invention is a system and method of single-carrier layer shifting for multiple-stream transmission facilitating SIC implementation. FIG. 3 is a simplified block diagram of a device-A 50 and a device-B 52 communicating over a channel 54 in the preferred embodiment of the present invention. The devices may be any communication device capable of communicating via the channel 54, such as a user equipment (UE) or a NodeB.

The present invention performs per-symbol layer shifting for multiple-stream transmission using DFTS-OFDM as an access technique. Specifically, the codeword-to-layer mapping is fixed within a DFTS-OFDM symbol and only shifted across consecutive DFTS-OFDM symbols. The present invention will be explained in a scenario where layer shifting is applied to two-layer MIMO transmission combined with DFTS-OFDM. In addition, two code words are assumed to be mapped into two layers according to a certain mapping rule. However, it should be understood that the present invention is applicable to any multiple-stream transmission.

Figure 4:
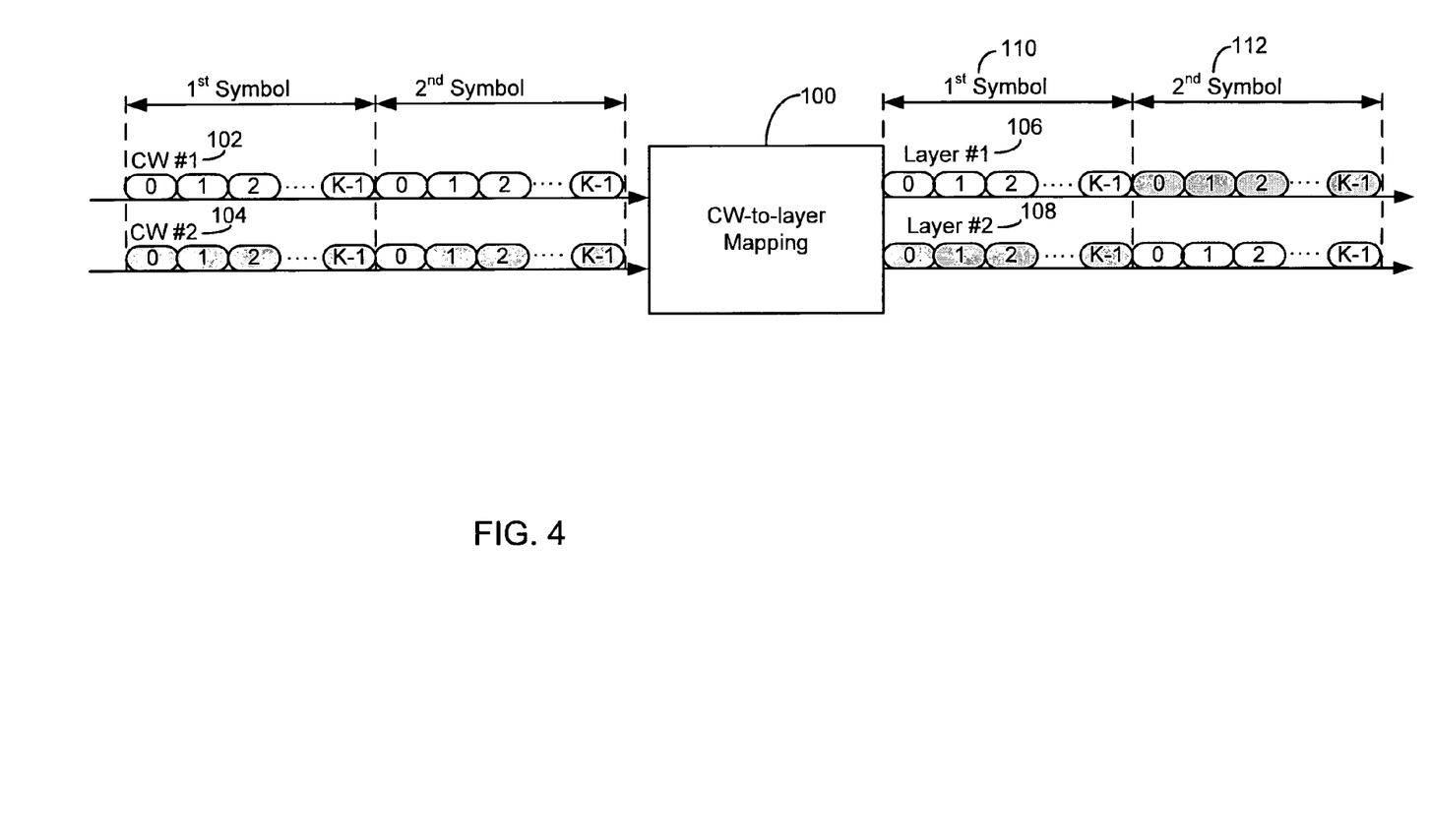
FIG. 4 is a simplified block diagram illustrating layer shifting in a per-symbol basis in one embodiment of the present invention.

FIG. 4 is a simplified block diagram illustrating layer shifting in a per-symbol basis in one embodiment of the present invention. The present invention performs the layer shifting by using a CW-to-layer mapping module 100 within Device-A or Device-B. As illustrated in FIG. 4, a CW #1 102 and a CW #2 104 are mapped into a Layer #1 106 and a Layer #2 108, respectively at the first DFTS-OFDM symbol 110. CW #1 and CW #2 are mapped into Layer #2 and Layer #1, respectively, at the second DFTS-OFDM symbol 112. In effect, each code word may be transmitted over multiple layers, exploiting diversity gain. However, although layer shifting is conducted, the resulting complexity of SIC at the receiver is exactly the same as that without layer shifting. Thus, the per-symbol layer shifting maintains the same level of complexity of SIC while improving the error performance. It should be understood that although FIG. 4 illustrates two streams/layers, the present invention may be used for more than two streams/layers.

Figure 5:
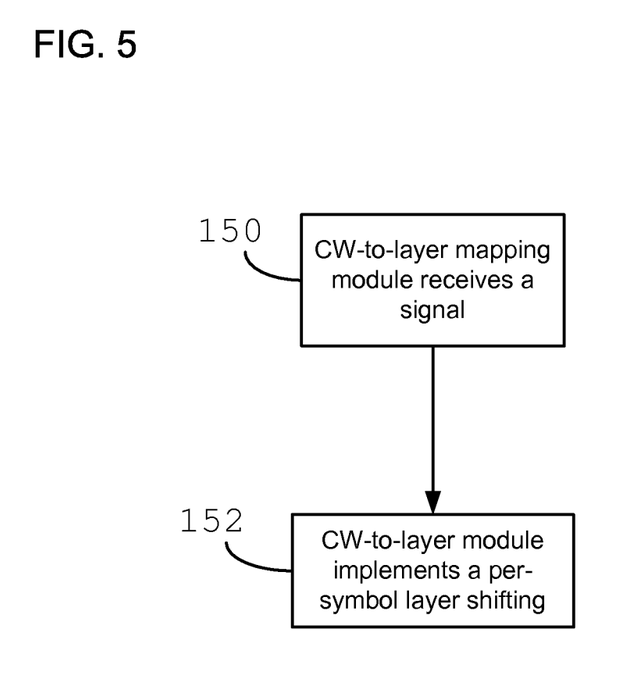
FIG. 5 is a flow chart illustrates the steps of a method of single-carrier layer shifting for multiple-stream transmission according to the teachings of the present invention.

FIG. 5 is a flow chart illustrates the steps of a method of single-carrier layer shifting for multiple-stream transmission according to the teachings of the present invention. With reference to FIGS. 3-5, the method will now be explained. In step 150, a CW-to-layer mapping module 100 receives a signal having a CW#1 102 and a CW #2 104. Each of the CW #1 and CW #2 includes a first symbol and a second symbol. Next, in step 152, the CW-to-layer module 100 implements a per-symbol layer shifting on the CW #1 and CW #2. CW #1 152 and a CW #2 104 are mapped into a Layer #1 106 and a Layer #2 108, respectively at a first DFTS-OFDM symbol 110. CW #1 and CW #2 are mapped into Layer #2 and Layer #1, respectively, at a second DFTS-OFDM symbol 112. As discussed above, although FIG. 4 illustrates two symbols/layers, the present invention may be used with two or more symbols/layers (including the situation where the number of layers is larger than the number of codewords).

As illustrated in FIG. 4, two code words are mapped into two layers according to per-symbol layer shifting. CW #1 and CW #2 are mapped into Layer #1 and Layer #2, respectively, at the first DFTS-OFDM symbol, while CW #1 and CW #2 are mapped into Layer #2 and Layer #1, respectively, at the second DFTS-OFDM symbol. If CW #1 is decoded first, the $2K \times 1$ vector symbol y″ representing the frequency-domain received symbols after cancellation at the first DFTS-OFDM symbol is expressed as $$y'' = \sqrt{\alpha K} H s'' + w \tag{5}$$

where

H is a $2K \times K$ vector representing the equivalent channel (including the precoder and DFT), s″ is a $K \times 1$ vector representing the transmitted symbols after cancellation.

Here H is given as $$G = \begin{pmatrix} e_{0,1} f_{0,0} & e_{0,1} f_{0,1} & e_{0,1} f_{0,2} & e_{0,1} f_{0,3} & \cdots & e_{0,1} f_{0,K-2} & e_{0,1} f_{0,K-1} \\ e_{1,1} f_{1,0} & e_{1,1} f_{1,1} & e_{1,1} f_{1,2} & e_{1,1} f_{1,3} & \cdots & e_{1,1} f_{1,K-2} & e_{1,1} f_{1,K-1} \\ \vdots & \vdots & \vdots & \vdots & \ddots & \vdots & \vdots \\ e_{K-1,1} f_{K-1,0} & e_{K-1,1} f_{K-1,1} & e_{K-1,1} f_{K-1,2} & e_{K-1,1} f_{K-1,3} & \cdots & e_{K-1,1} f_{K-1,K-2} & e_{K-1,1} f_{K-1,K-1} \end{pmatrix} \tag{6}$$

where $e_{k,n}$ is the n-th column vector of $E_k$, $f_{k,l}$ is the (k,l)-entry of $F_K$.

In equation, 6, each row of H consists of block matrices (vectors) which are given by scalar multiplications of the same matrix (vector). For example, each block matrix (vector) at the k-th row of H is a scalar multiplication of $e_{k,l}$. Therefore, H is decomposed into a block-diagonal matrix (representing the per-subcarrier frequency-flat fading channel) and a unitary matrix (representing the per-layer DFT) as $$H = \begin{pmatrix} e_{0,1} & 0 & \cdots & 0 \\ 0 & e_{1,1} & \ddots & \vdots \\ \vdots & \ddots & \ddots & 0 \\ 0 & \cdots & 0 & e_{K-1,1} \end{pmatrix} F_K. \tag{7}$$

Equations 6 and 7 hold true at the second DFTS-OFDM symbol 112 as well. Consequently, the equalization is the per-subcarrier equalization followed by per-layer IDFT, which involves the same level of computational complexity as equalization without layer shifting.

In the present invention, the code words may be mapped to an arbitrary number of DFTS-OFDM symbols. It is evident that the number of different layer shifts equals the transmission rank. Thus, in the case of three layers, there are three different possible shifts of the layers. In general, it is preferable to ensure that a transport block experiences all possible shifts with as similar channels as possible. In addition, all the layer shifts are preferably applied in equal proportion. This maximizes the similarity in quality between all code words and is also beneficial for diversity.

An equal proportion of layer shifts may be achieved by cycling through the different layer shifts over one subframe. If the number of data-carrying DFTS-OFDM symbols to which a transport block is mapped to during one subframe is an integer multiple of the transmission rank, each shift may be applied to the same number of DFTS-OFDM symbol instances for a code word. For deployments using normal cyclic prefix in LTE, there are 12 DFTS-OFDM symbols available for data. Since 12=1*12=2*6=3*4=4*3, all transmission ranks up to 4 are covered with a resulting balanced use of layer shifts within a subframe. However, for long cyclic prefix, there are only 10 DFTS-OFDM symbols available, which can then only handle transmission ranks up to 2 in a balanced manner.

Figure 6:
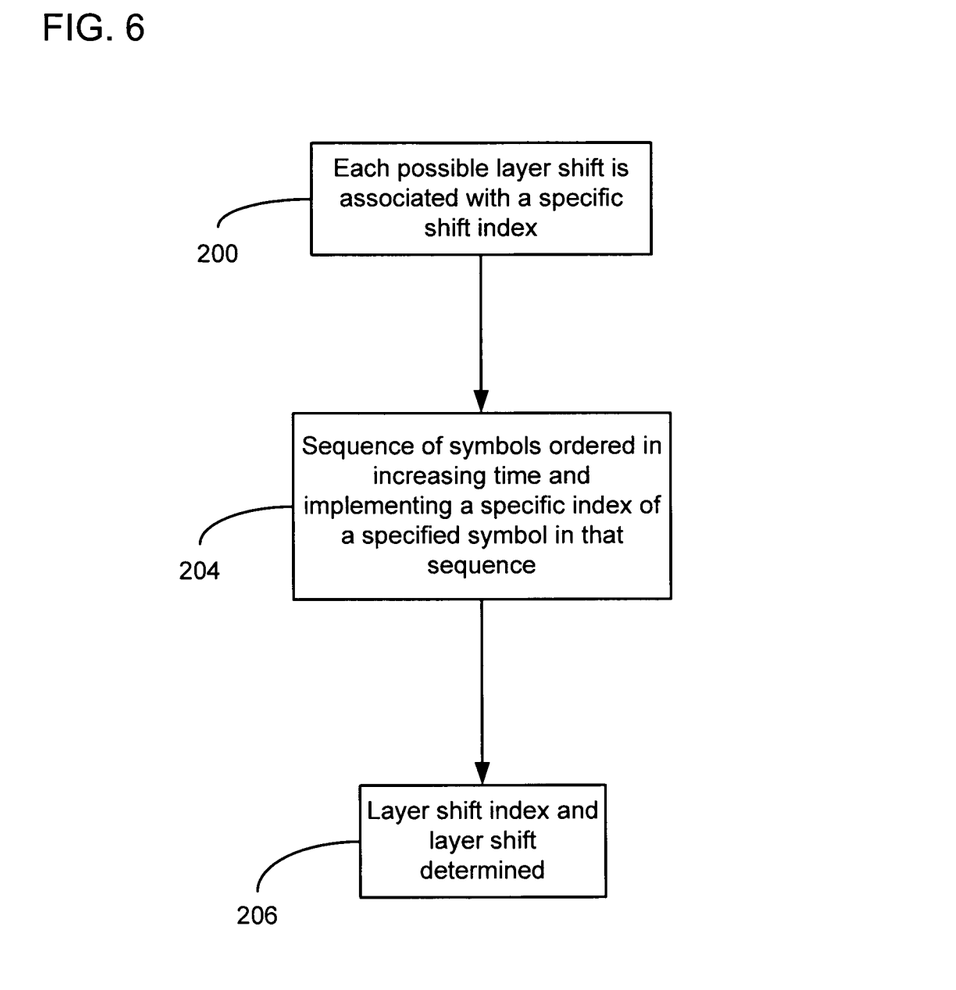
FIG. 6 is a flow chart illustrating the steps of applying layer shifting where different subframes use different patterns.

In the present invention, to rectify this problem, rather than letting the shifting pattern repeat for each subframe, in the present invention, the layer shifts may be applied so that different subframes see different patterns. To achieve this implementation, several steps are preferably performed. FIG. 6 is a flow chart illustrating the steps of applying layer shifting where different subframes use different patterns. In step 200, each possible layer shift is associated with a specific shift index i∈{0, 1, . . . , r−1} where r is the transmission rank. $s_i$ denotes the layer shift associated with shift index i. Next, in step 204, the sequence of all data-carrying DFTS-OFDM symbols over consecutive subframes are ordered in increasing time and where k=0, 1, . . . denotes the index of a certain DFTS-OFDM symbol in that sequence. In step 206, the layer shift index and also the layer shift, to use for data-carrying DFTS-OFDM symbol k, are then determined as i=k mod r.

This procedure signifies that the layer shifts on average are used in a balanced manner, although it cannot always be guaranteed for a particular subframe. The index k may be made a function of the system frame number (SFN), the subframe number within a frame and the current DFTS-OFDM symbol within the subframe, all of which are known to both device-A and device-B.

Various implementations for the approach described above may be used. For example, independent layer shift indices for the different Hybrid Automatic Repeat Request (HARQ) processes may be used. This implementation may increase the chance of more balanced use of the layer shifts for the same transport block in a situation where the transport block is retransmitted. This procedure may also be modified to accommodate such HARQ process independent shifting by using HARQ process specific DFTS-OFDM symbol indices $k_n$ in step 204 of FIG. 6 and then similarly HARQ process specific layer shift indices $i_n$ in step 206 where n represents the HARQ process number.

The use of long cyclic prefix is not the only situation in which the layer shifts become unbalanced within a subframe. If sounding reference signals (SRS) are configured, the last DFTS-OFDM symbol in each subframe is removed and replaced by SRS. Thus, only 11 and 9 DFTS-OFDM symbols are available for data in normal and long cyclic prefix, respectively. The procedure discussed above may also be used in such situations.

For complexity reasons in the receiver, in one embodiment, it may be advantageous to keep the same layer shift for a number of consecutive DFTS-OFDM symbols before switching to the next layer shift. This limits the number of recalculations of equalizer weights needed in the receiver. Such a modification may be achieved, for example, by using $$i = \left\lfloor \frac{k}{M} \right\rfloor \bmod r$$

in step 204 of FIG. 6, where M is a parameter that controls the number of consecutive data-carrying DFTS-OFDM symbols for which the layer shift is kept fixed.

Although the present invention has been explained in terms of 3GPP LTE, this should not be seen as limiting the scope of the invention to only the aforementioned system. The present invention may also be implemented in other wireless systems, such as Wideband Code Division Multiple Access (WCDMA), Worldwide Interoperability for Microwave Access (WiMax), Ultra-Mobile Broadband (UMB) and Global System for Mobile Communications (GSM). In addition, terminology such as NodeB and UE has been used and does not imply a certain hierarchical relation between the two. The invention is layer shifting for multiple-stream transmission employing DFT-S-OFDMA.

The present invention provides many advantages over existing systems. Since each codeword may be effectively transmitted over multiple layers, the present invention provides diversity gain which leads to improved error performance. The improved diversity typically also means the link adaption becomes more accurate. The perceived channel quality experienced by the different code words also becomes more similar, thereby reducing the loss associated with techniques such as Acknowledgment (ACK)/Negative Acknowledgment (NACK) bundling where multiple code words share the same ACK/NACK. Furthermore, since the codeword-to-layer mapping is fixed within a DFTS-OFDM symbol in the present invention, the resulting computational complexity of SIC at the receiver (equalization, reconstruction and cancellation) is exactly the same as that without layer shifting. Thus, the layer shifting improves the error performance without increasing the computational complexity. Additionally, the per-symbol layer shifting provides diversity gain, leading to improved error performance. Since the codeword-to-layer mapping is fixed within a DFTS-OFDM symbol, the equalization for SIC receivers is as simple as SIC receivers without layer shifting.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The invention claimed is:

1. A method of single-carrier layer shifting for multiple-stream transmission in a network, the method comprising the steps of:
   receiving a multiple-stream transmission, wherein the transmission includes a plurality of subframes and a plurality of information carrying symbols transmitted on a plurality of layers; and
   implementing per-symbol layer shifting on the transmission, wherein layer shifting is conducted upon each symbol.

2. The method according to claim 1 wherein the method utilizes Discreet Fourier Transform Spread (DFTS)-Orthogonal Frequency Division Multiplexing (OFDM) access in the network and the plurality of symbols are DFTS-OFDM symbols.

3. The method according to claim 2 wherein the step of implementing per-symbol layer shifting includes applying code word-to-layer mapping within a DFTS-OFDM symbol and shifting layers of the transmission across consecutive DFTS-OFDM symbols within the transmission.

4. The method according to claim 2 wherein a number of DFTS-OFDM symbols mapped during one subframe is an integer multiple of a number of the plurality of layers in the transmission.

5. The method according to claim 2 wherein each code word is transmitted over the plurality of layers of the transmission.

6. The method according to claim 1 wherein the step of implementing per-symbol layer shifting includes cycling through different layers of the plurality of layers over one of the subframes of the transmission.

7. The method according to claim 6 wherein the step of implementing per-symbol layer shifting includes applying a different pattern of layer shift for each subframe.

8. The method according to claim 7 wherein the step of implementing per-symbol layer shifting includes the steps of:
associating each possible layer shift with a specific shift index based on a number of layers in the transmission;
determining a sequence of all symbols, the sequence based on an increasing time order of the symbols; and
applying the layer shift index for implementing the layer shifting based on the sequence.

9. The method according to claim 1 wherein:
a sounding reference signal (SRS) is configured in the transmission; and
the last symbol in each subframe is removed and replaced by the SRS.

10. The method according to claim 1 wherein the step of implementing per-symbol layer shifting includes applying a same layer shift to a specified number of consecutive symbols before switching to another layer.

11. A system for single-carrier layer shifting for multiple-stream transmission in a network, the system comprising:
a first communication device capable of transmitting information wirelessly, the first communication device configured to:
process a multiple-stream transmission for transmission to a second communication device, wherein the transmission includes a plurality of subframes and a plurality of information carrying symbols transmitted on a plurality of layers; and
implement per-symbol layer shifting on the transmission, wherein layer shifting is conducted upon each symbol; and
the second communication device capable of receiving information wirelessly from the first communication device.

12. The system according to claim 11 wherein the system utilizes Discreet Fourier Transform Spread (DFTS)-Orthogonal Frequency Division Multiplexing (OFDM) access in the network and the plurality of symbols are DFTS-OFDM symbols.

13. The system according to claim 12 wherein the first communication device is configured to implement per-symbol layer shifting by applying code word-to-layer mapping within a DFTS-OFDM symbol and shifting layers of the transmission across consecutive DFTS-OFDM symbols within the transmission.

14. The system according to claim 12 wherein a number of DFTS-OFDM symbols mapped during one subframe is an integer multiple of a number of the plurality of layers in the transmission.

15. The system according to claim 12 wherein each code word is transmitted over the plurality of layers of the transmission.

16. The system according to claim 11 wherein the first communication device is configured to implement per-symbol layer shifting by cycling through different layers of the plurality of layers over one of the subframes of the transmission.

17. The system according to claim 16 wherein the first communication device is configured to implement per-symbol layer shifting by applying a different pattern of layer shift for each subframe.

18. The system according to claim 17 wherein the first communication device is further configured to:
associate each possible layer shift with a specific shift index based on a number of layers in the transmission;
determine a sequence of all symbols, the sequence based on an increasing time order of the symbols; and
apply the layer shift index for implementing the layer shifting based on the sequence.

19. The system according to claim 11 wherein:
a sounding reference signal (SRS) is configured in the transmission; and
the last symbol in each subframe is removed and replaced by the SRS.

20. The system according to claim 11 wherein the first communication device is configured to implement per-symbol layer shifting by applying a same layer shift to a specified number of consecutive symbols before switching to another layer.

21. A node for single-carrier layer shifting for multiple-stream transmission in a network, the node comprising:
a first communication device configured to:
process a multiple-stream transmission for transmission from the first communication device to a second communication device, wherein the transmission includes a plurality of subframes and a plurality of information carrying symbols transmitted on a plurality of layers; and
implement per-symbol layer shifting on the transmission, wherein layer shifting is conducted upon each symbol.

22. The node according to claim 21 wherein the node utilizes Discreet Fourier Transform Spread (DFTS)-Orthogonal Frequency Division Multiplexing (OFDM) access in the network and the plurality of symbols are DFTS-OFDM symbols.

23. The node according to claim 22 wherein the first communication device is configured to implement per-symbol layer shifting by applying code word-to-layer mapping within a DFTS-OFDM symbol and shifting layers of the transmission across consecutive DFTS-OFDM symbols within the transmission.

24. The node according to claim 22 wherein a number of DFTS-OFDM symbols mapped during one subframe is an integer multiple of a number of the plurality of layers in the transmission.

25. The node according to claim 22 wherein each code word is transmitted over the plurality of layers of the transmission.

26. The node according to claim 21 wherein the first communication device is configured to implement per-symbol layer shifting by cycling through different layers of the plurality of layers over one of the subframes of the transmission.

27. The node according to claim 26 wherein the first communication device is configured to implement per-symbol layer shifting by applying a different pattern of layer shift for each subframe.

28. The node according to claim 27 wherein the first communication device is further configured to:
associate each possible layer shift with a specific shift index based on a number of layers in the transmission;

determine a sequence of all symbols, the sequence based on an increasing time order of the symbols; and the layer shift index for implementing the layer shifting based on the sequence.

29. The node according to claim 21 wherein:

a sounding reference signal (SRS) is configured in the transmission; and the last symbol in each subframe is removed and replaced by the SRS.

30. The node according to claim 21 wherein the first communication device is configured to implement per-symbol layer shifting by applying a same layer shift to a specified number of consecutive symbols before switching to another layer.

* * * * *

UNITED STATES PATENT AND TRADEMARK OFFICE
CERTIFICATE OF CORRECTION

| | | |
|---|---|---|
| PATENT NO. | : 8,824,578 B2 | Page 1 of 1 |
| APPLICATION NO. | : 13/128932 | |
| DATED | : September 2, 2014 | |
| INVENTOR(S) | : Park et al. | |

It is certified that error appears in the above-identified patent and that said Letters Patent is hereby corrected as shown below:

Title page, item (75), under "Inventors", in Column 1, Line 1, delete "Durham, NC (US);" and insert -- Santa Clara, CA (US); --, therefor.

In the Specification

In Columns 7-8, Line 24, in Equation (6), delete "G=" and insert -- H= --, therefor.

In Column 9, Line 62, delete "modr" and insert -- mod r --, therefor.

In Column 10, Line 12, delete "DFT-S-OFDMA." and insert -- DFTS-OFDM. --, therefor.

Signed and Sealed this
Fourth Day of August, 2015

Michelle K. Lee
*Director of the United States Patent and Trademark Office*